(12) United States Patent
Hirano et al.

(10) Patent No.: US 7,133,243 B2
(45) Date of Patent: Nov. 7, 2006

(54) BURST POSITION ERROR DATA WRITE METHOD AND MAGNETIC DISK UNIT

(75) Inventors: Masakazu Hirano, Kawasaki (JP); Nobuyuki Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 22 days.

(21) Appl. No.: 09/961,727

(22) Filed: Sep. 24, 2001

(65) Prior Publication Data

US 2002/0196576 A1  Dec. 26, 2002

(30) Foreign Application Priority Data

Jun. 21, 2001  (JP) ............................. 2001-188185

(51) Int. Cl.
*G11B 5/596* (2006.01)
(52) U.S. Cl. .................. 360/77.04; 360/77.08
(58) Field of Classification Search ................. 360/69, 360/75, 77.04, 77.07, 77.08, 61, 77.01, 77.02, 360/77.03, 77.05, 77.06
See application file for complete search history.

(56) References Cited

U.S. PATENT DOCUMENTS

| | | | |
|---|---|---|---|
| 4,048,660 A | 9/1977 | Dennison et al. | 360/77 |
| 4,390,912 A | 6/1983 | Hertrich et al. | 360/78 |
| 4,656,538 A | 4/1987 | Mattson | 360/77 |
| 5,453,887 A | 9/1995 | Negishi et al. | 360/77.1 |
| 5,500,776 A * | 3/1996 | Smith | 360/77.04 |
| 5,793,559 A * | 8/1998 | Shepherd et al. | 360/78.09 |
| 5,825,578 A * | 10/1998 | Shrinkle et al. | 360/77.08 |
| 5,867,343 A * | 2/1999 | Le et al. | 360/77.08 |
| 6,061,200 A * | 5/2000 | Shepherd et al. | 360/77.04 |
| 6,172,839 B1 | 1/2001 | Ahn | 360/77.08 |
| 6,657,810 B1 * | 12/2003 | Kupferman | 360/77.04 |

FOREIGN PATENT DOCUMENTS

| | | |
|---|---|---|
| EP | 0 471 314 | 2/1992 |
| JP | 07/006525 | 1/1995 |
| JP | 07-226041 | 8/1995 |
| JP | 09-035225 | 2/1997 |
| JP | 10-27442 | 1/1998 |

* cited by examiner

*Primary Examiner*—Wayne Young
*Assistant Examiner*—Daniell L. Negrón
(74) *Attorney, Agent, or Firm*—Greer, Burns & Crain, Ltd

(57) ABSTRACT

A magnetic disk unit writes, on a magnetic disk, a burst position error data which is used for correcting a positional error of a burst pattern which is used for correcting an error within one track, next to the burst pattern. A write head is controlled a position so as to satisfy a relationship $M=N$ when $(N-1)K<WHD<NK$, where WHD denotes a core width of a write head, K denotes a pitch of burst boundaries of the burst pattern, and M denotes a number of regions of the burst position error data which need to be provided after the burst pattern. The burst position error data is written on the magnetic disk by the write head the position of which is controlled in this manner.

17 Claims, 11 Drawing Sheets

| READ/WRITE RECOVERY REGION | SERVO MARK REGION | GRAY CODE REGION | BURST PATTERN REGION | BURST POSITION ERROR DATA REGION | GAP REGION |

BURST POSITION ERROR DATA WRITE METHOD AND MAGNETIC DISK UNIT

BACKGROUND OF THE INVENTION

This application claims the benefit of a Japanese Patent Application No.2001-188185 filed Jun. 21, 2001, in the Japanese Patent Office, the disclosure of which is hereby incorporated by reference.

FIELD OF THE INVENTION

The present invention generally relates to burst position error data write methods and magnetic disk units, and more particularly to a burst position error data write method and a magnetic disk unit which write on a magnetic disk burst position error data used for correcting a positional error of a burst pattern, so that the burst position error data can be positively read from the magnetic disk when reading servo information which are written in advance on the magnetic disk.

DESCRIPTION OF THE RELATED ART

Among the various magnetic disks, there are magnetic disks which employ the so-called embedded servo system. According to the embedded servo system, the servo information is written in advance within the data in a data area, without providing an exclusive data area therefor. The servo information is used to accurately detect the movement of a head in an off-track direction on the magnetic disk. For example, the servo information is written on the magnetic disk in advance by use of a servo track writer (STW) designed exclusively therefor.

The servo information is written with a servo frame format shown in FIG. 1, for example. The servo frame format includes a read/write recovery region for absorbing a transient that is generated when switching from a data write operation to a servo read operation, a servo mark region for confirming a start of a servo pattern region, a Gray code region in which cylinder address information is encoded, a position region in which a burst signal is written, a gap region for indicating an end of the servo frame, and the like. The position region includes a burst pattern region which is written with a burst pattern for correcting an error within one track, and a data region which is written with a burst position error data for correcting a positional error of the burst pattern. The burst position error data is sometimes also referred to as a repeatable run-out (RRO) correction data for correcting the repeatable run-out (RRO).

FIG. 2 is a diagram showing an arrangement of the burst position error data written on the magnetic disk by a conventional burst position error data write method, for a case where a feed pitch is ½ track. In FIG. 2, a bold solid line indicates a boundary line of the adjacent cylinders (or tracks), and a broken line indicates a center of a cylinder (or track). Accordingly, in FIG. 2, a vertical direction corresponds to a radial direction of the magnetic disk, and a horizontal direction corresponds to a circumferential direction of the magnetic disk. A burst position error data 2 which is written next to a burst pattern 1, is used to correct an error of a write head 3 from the center of the cylinder to which the write head 3 is on-track, and to correct an error of a read head 4 from the center of the cylinder to which the read head 4 is on-track.

A core width 3-CW of the write head 3 is approximately 75% of a cylinder width 6, and a core width 4-CW of the read head 4 is approximately 50% of the cylinder width 6. For this reason, a region 5 in which no burst position error data is written is generated in a position region as indicated by cross-hatching in FIG. 2. In a case where a positional error of the read head 4 from a target cylinder immediately after a seek is relatively small, the read head 4 can read the burst position error data 2 as indicated by P1 in FIG. 2. However, in a case where the positional error of the read head 4 from the target cylinder is relatively large, there is a possibility that the read head 4 scans a region which is written with the burst position error data 2 as indicated by P2 in FIG. 2, and there is a possibility in this case that the burst position error data 2 cannot be read by the read head 4.

Accordingly, the present inventors have studied a conceivable burst position error data write method for eliminating the above described problem. FIG. 3 is a diagram showing an arrangement of the burst position error data written on the magnetic disk by this conceivable burst position error data write method, for a case where the feed pitch is ½ track. In FIG. 3, those parts which are the same as those corresponding parts in FIG. 2 are designated by the same reference numerals, and a description thereof will be omitted.

According to this conceivable burst position error data write method, the burst position error data 2 is overwritten in the circumferential direction of the magnetic disk, so as to prevent generation of the region 5 in which no burst position error data 2 is written, as in the case shown in FIG. 2. However, because the burst position error data 2 is repeatedly written, portions where the burst position error data 2 is overwritten is generated in the radial direction of the magnetic disk, to thereby generate a write phase error 7 as shown in FIG. 3. Such portions where the burst position error data 2 is overwritten in the radial direction occur when the core width 3-CW of the write head 3 is greater than two times the pitch of the boundaries of the burst pattern 1, that is, when the code width 3-CW of the write head 3 is greater than the cylinder width 6. When the burst position error cata 2 including such a write phase error 7 is read, there is a possibility that the burst position error data 2 will not be recognized correctly.

There is a possibility that the burst position error data which is written on the magnetic disk by the conventional burst position error data write method cannot be read when the positional error of the read head from the target cylinder immediately after the seek is relatively large, because there is a possibility that the read head will scan the region which is not written with the burst position error data.

On the other hand, the burst position error data which is written on the magnetic disk by the conceivable burst position error data write method studied by the present inventors can positively be read even when the positional error of the read head from the target cylinder immediately after the seek is relatively large, because the read head will always scan the region which is written with the burst position error data. However, because of the write phase error which is caused by the repeated writing of the burst position error data, there is a possibility that the burst position error data cannot be recognized correctly.

SUMMARY OF THE INVENTION

Accordingly, it is a general object of the present invention to provide a novel and useful burst position error data write method and magnetic disk unit, in which the problems described above are eliminated.

Another and more specific object of the present invention is to provide a burst position error data write method and a magnetic disk unit, which can write burst position error data of control information on a magnetic disk in such a manner that the burst position error data can positively be read from the magnetic disk.

Still another object of the present invention is to provide a burst position error data write method for writing, on a magnetic disk, a burst position error data which is used for correcting a positional error of a burst pattern which is used for correcting an error within one track, next to the burst pattern, comprising the step of writing the burst position error data so as to satisfy a relationship M=N when (N−1)K<WHD<NK, where WHD denotes a core width of a write head, K denotes a pitch of burst boundaries of the burst pattern, and M denotes a number of regions of the burst position error data which need to be provided after the burst pattern. According to the burst position error data write method of the present invention, it is possible to write the burst position error data of the control information on the magnetic disk in such a manner that the burst position error data can positively be read from the magnetic disk.

A further object of the present invention is to provide a burst position error data write method for writing, on a magnetic disk, a burst position error data which is used for correcting a positional error of a burst pattern which is used for correcting an error within one track, next to the burst pattern, comprising the step of writing the burst position error data by moving a write head to a position offset in a direction opposite to and by an offset amount identical to an error amount the write head is offset when switching from a normal data write operation to a normal data read operation. According to the burst position error data write method of the present invention, it is possible to write the burst position error data of the control information on the magnetic disk in such a manner that the burst position error data can positively be read from the magnetic disk.

Another object of the present invention is to provide a magnetic disk unit which writes, on a magnetic disk, a burst position error data which is used for correcting a positional error of a burst pattern which is used for correcting an error within one track, next to the burst pattern, comprising control means for controlling a position of a write head so as to satisfy a relationship M=N when (N−1)K<WHD<NK, where WHD denotes a core width of a write head, K denotes a pitch of burst boundaries of the burst pattern, and M denotes a number of regions of the burst position error data which need to be provided after the burst pattern; and write means for writing the burst position error data on the magnetic disk by the write head the position of which is controlled by the control means. According to the magnetic disk unit of the present invention, it is possible to write the burst position error data of the control information on the magnetic disk in such a manner that the burst position error data can positively be read from the magnetic disk.

Still another object of the present invention is to provide a magnetic disk unit which writes, on a magnetic disk, a burst position error data which is used for correcting a positional error of a burst pattern which is used for correcting an error within one track, next to the burst pattern, comprising control means for moving a write head to a position offset in a direction opposite to and by an offset amount identical to an error amount the write head is offset when switching from a normal data write operation to a normal data read operation; and write means for writing the burst position error data on the magnetic disk by the write head the position of which is controlled by the control means. According to the magnetic disk unit of the present invention, it is possible to write the burst position error data of the control information on the magnetic disk in such a manner that the burst position error data can positively be read from the magnetic disk.

Other objects and further features of the present invention will be apparent from the following detailed description when read in conjunction with the accompanying drawings.

DESCRIPTION OF THE PREFERRED EMBODIMENTS

A description will now be given of embodiments of a burst position error data write method according to the present invention and a magnetic disk unit according to the present invention, by referring to FIG. 4A and the subsequent drawings.

Figure 4A:
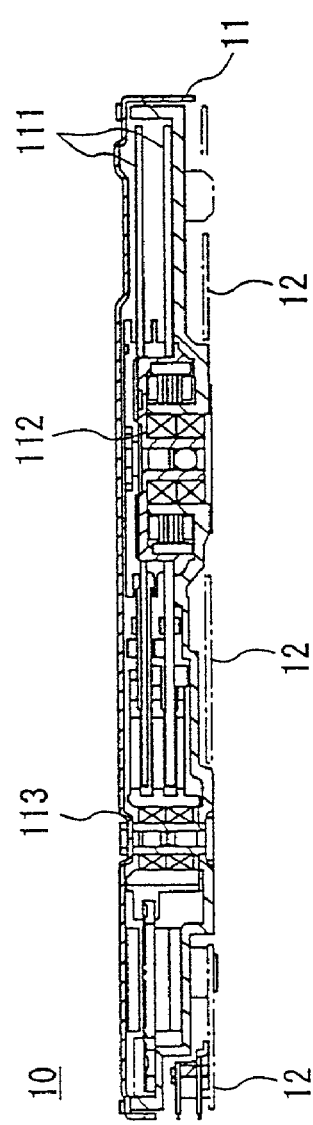
FIGS. 4A and 4B respectively are a cross sectional view and a plan view showing a basic structure of an embodiment of a magnetic disk unit according to the present invention.
Figure 4B:
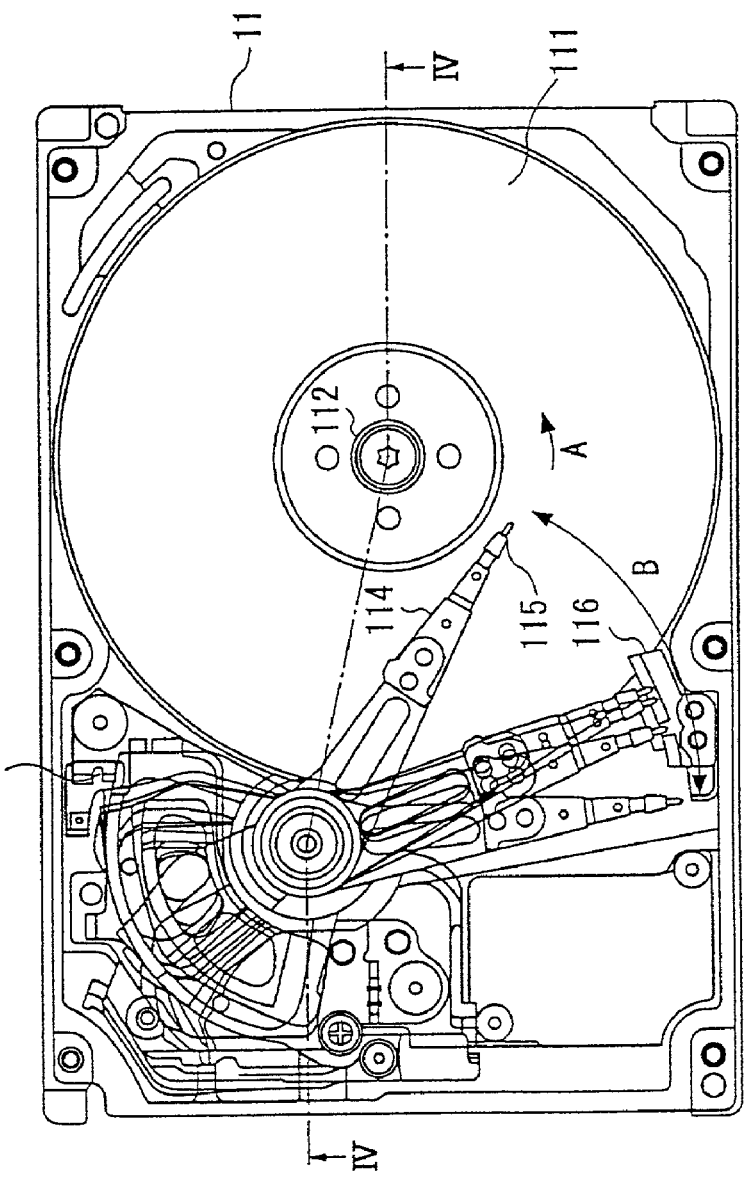

FIGS. 4A and 4B respectively are diagrams showing a basic structure of an embodiment of the magnetic disk unit according to the present invention. In this embodiment of the magnetic disk unit, the present invention is applied to a hard disk drive (HDD) which is provided with a hard disk. In addition, this embodiment of the magnetic disk unit employs an embodiment of the burst position error data write method according to the present invention. FIG. 4B is a plan view showing the HDD with a top portion thereof removed, and FIG. 4A is a cross sectional view of the HDD taken along a line IV—IV in FIG. 4B.

As shown in FIGS. 4A and 4B, a HDD 10 generally includes a disk enclosure (DE) 11 and a printed circuit assembly (PCA) 12. Hard disks 111, a spindle motor (SPM) 112, a voice coil motor (VCM) 113, arms 114, heads 115, ramp mechanisms 116 and the like are provided within the disk enclosure 11. The disk 111 is rotated in an arrow direction A by the spindle motor 112. The VCM 113 turns the arm 114 in an arrow direction B, and moves the head 115 in a radial direction of the disk 111, so as to make the head 115 scan a desired track during a seek, for example. The ramp mechanism 116 is disposed on the outer side of the disk 111, and is provided to engage a tip end of the arm 114 and maintain the head 115 separated from the disk 111. The head 115 includes a write head and a read head.

Of course, the basic structure of the magnetic disk unit is not limited to the basic structure shown in FIG. 4, and various known basic structures may be employed. As will be described later, the present invention is applicable to a magnetic disk unit having any basic structure, as long as the magnetic disk unit has a function of writing burst position error data of servo information on the disk 111 as will be described later.

Figure 5:
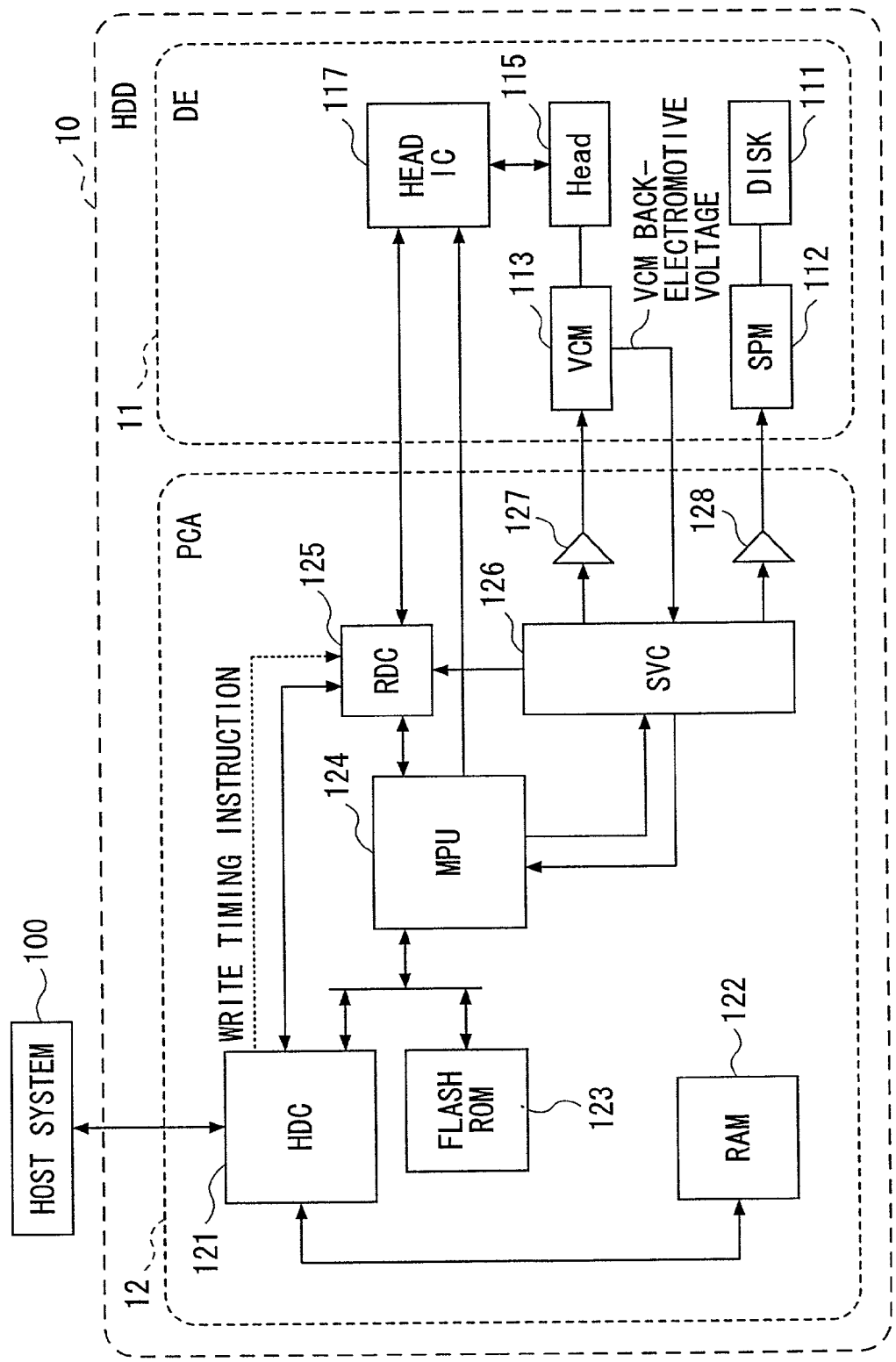
FIG. 5 is a system block diagram showing a structure of a control system of the embodiment of the magnetic disk unit.

FIG. 5 is a system block diagram showing a structure of a control system of this embodiment of the magnetic disk unit. In FIG. 5, the disk 111, the spindle motor 112, the voice coil motor 113, the head 115, a head IC 117 and the like are provided within the disk enclosure 11. On the other hand, a hard disk controller (HDC) 121, a RAM 122, a flash ROM 123, a MPU 124, a read channel (RDC) 125, a servo controller (SVC) 126, drivers 127 and 128 and the like are provided within the PCA 12.

In the disk enclosure 11, the head IC 117 subjects a signal read from the disk 111 by the head 115 to a predetermined process including an amplifying process and the like, before supplying the read signal to the read channel 125 within the PCA 12. The head IC 117 also supplies a write signal received from the MPU 124 to the head 115 so as to write the write signal on the disk 111. The voice coil motor 113 drives the arm 114 based on a control signal which is received from the servo controller 126 within the PCA 12 via the driver 127. A load operation which loads the head 115 from the ramp mechanism 116 onto the disk 111, and an unload operation which unloads the head 115 from the disk 111 onto the ramp mechanism 116, are carried out by driving the arm 114. The spindle motor 112 rotates the disk 111 based on a control signal which is received from the servo controller 126 within the PCA 12 via the driver 128.

In the PCA 12, the HDC 121 supplies a read/write instruction to the MPU 124 based on an instruction from a host system 100. The MPU 124 controls the operation of the control system including the servo controller 126, based on the instruction from the HDC 121 and the read signal which is received via the read channel 125. The write signal is supplied to the head IC 117 within the disk enclosure 11 via the HDC 121 and the MPU 124, and the read signal from the head IC 117 is supplied to the MPU 124 and the HDC 121 via the read channel 125. The read signal which is supplied to the HDC 121 is supplied to the host system 100. The flash ROM 123 stores various data which are used when the MPU 124 operates, and the RAM 122 temporarily stores various data which are used when the MPU 124 and the HDC 121 operate.

The structure of the control system of the magnetic disk unit is of course not limited to the structure shown in FIG. 5, and various known structures may be used for the control system. As will be described later, the control system may have any structure as long as the control system includes the function of writing the burst position error data of the servo information on the disk 111 as will be described later.

Figure 6:
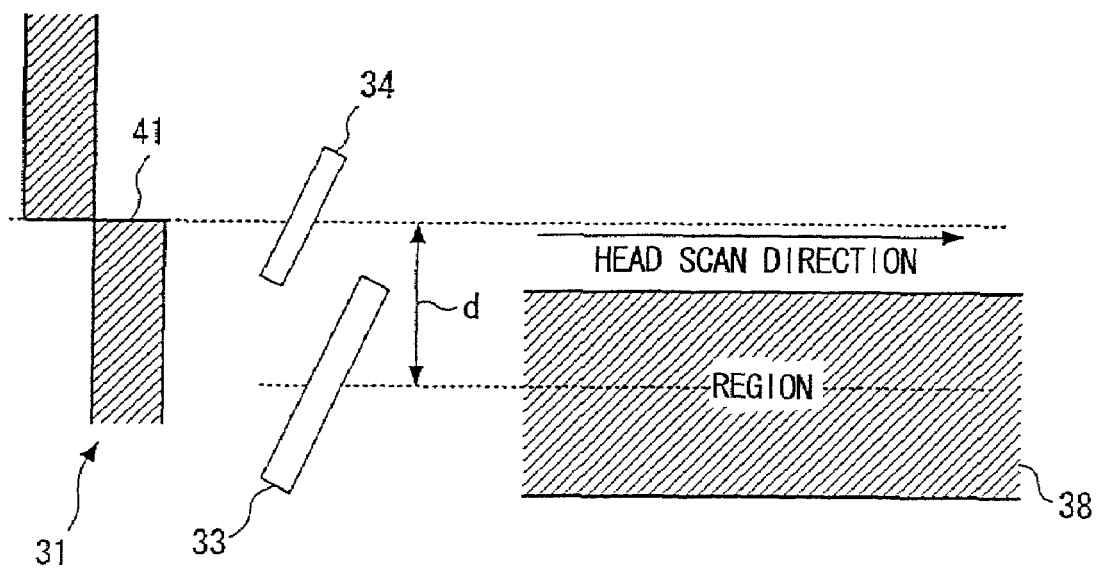
FIG. 6 is a diagram for explaining a write head positioning method when carrying out a normal data write.

FIG. 6 is a diagram for explaining a write head positioning method when carrying out a normal data write. As shown in FIG. 6, during the normal data write, a read head 34 is on-track with respect to a burst boundary 41 of a burst pattern 31 for correcting an error within one track. The burst boundary 41 is a boundary line of the burst pattern 31 along the circumferential direction of the disk 111. In this state, the write head 33 is located at a position deviated from the burst boundary 41 by an error amount d in the radial direction of the disk 111, due to causes such as an error in a YAW angle and an error in the mounting position of the head 115 with respect to the arm 114. In other words, when the center of a target cylinder (or track) matches the burst boundary 41, the write head 33 is located at the position deviated by the error amount d from the center of this target cylinder. This error amount d indicates an error in the radial direction between the center of the core width of the read head 34 and the center of the core width of the write head 33. Accordingly, the write head 33 writes normal data in a region 38 indicated by the hatching in FIG. 6.

Figure 7:
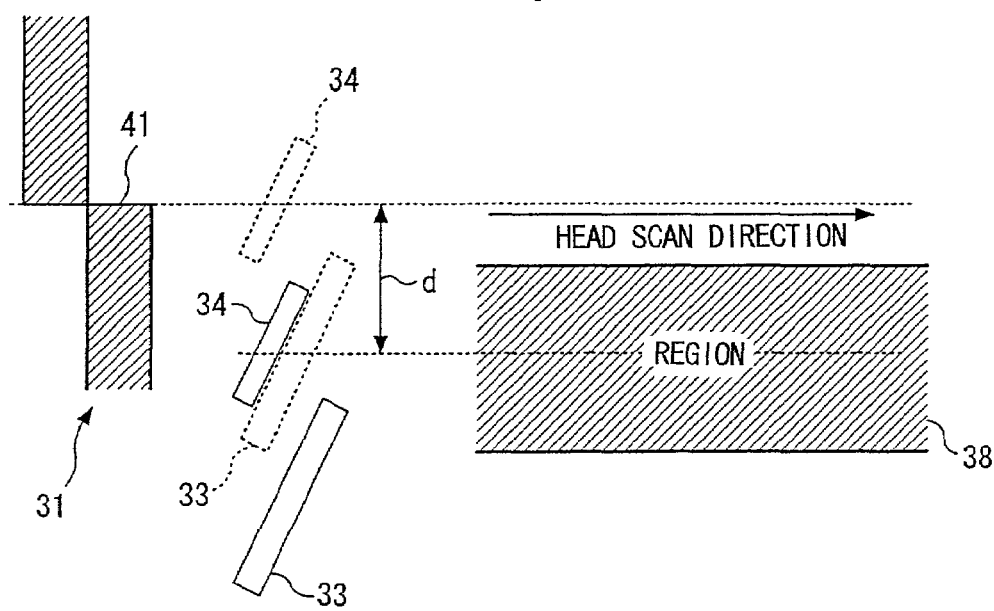
FIG. 7 is a diagram for explaining a positional relationship of a read head and a write head when reading normal data written on a target cylinder.

FIG. 7 is a diagram for explaining a positional relationship of the read head 34 and the write head 33 when reading the normal data which is written on the target cylinder as described above. In FIG. 7, those parts which are the same as those corresponding parts in FIG. 6 are designated by the same reference numerals, and a description thereof will be omitted. As shown in FIG. 7, when reading the normal data written on the target cylinder, the read head 34 is moved, not to the center of the target cylinder, but to a position offset by the error amount d of the read head 34 in the radial direction with respect to the read head 34, so as to read the data. Such a control itself of the head 115 during the write and the read of the normal data is known.

Figure 8:
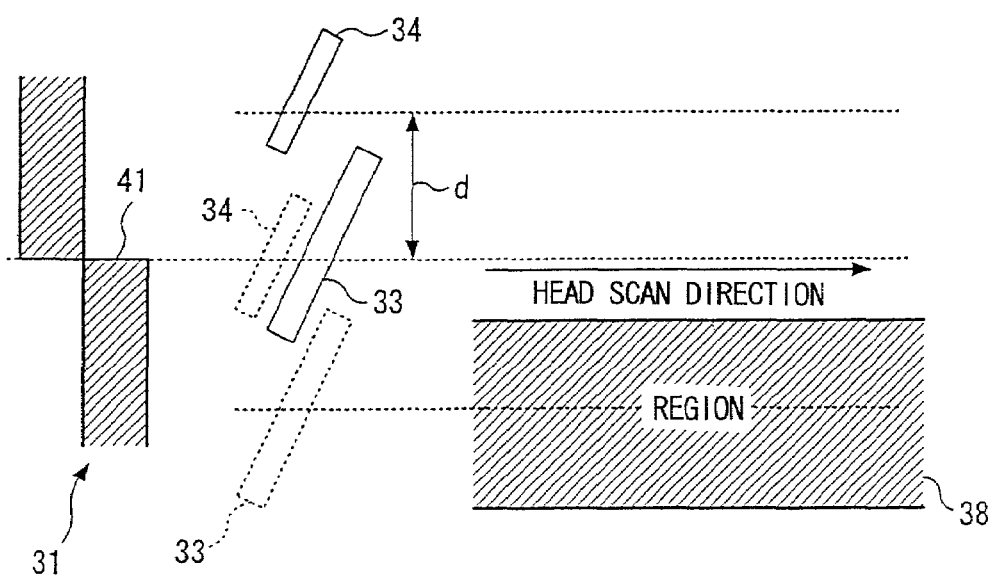
FIG. 8 is a diagram for explaining the positional relationship of the read head and the write head when writing burst position error data.

Next, a description will be given of a positional relationship of the read head and the write head when writing the burst position error data in this embodiment, by referring to FIG. 8. FIG. 8 is a diagram for explaining the positional relationship of the read head 34 and the write head 33 when writing the burst position error data in this embodiment. In FIG. 8, those parts which are the same as those corresponding parts in FIG. 6 are designated by the same reference numerals, and a description thereof will be omitted.

As shown in FIG. 8, when writing the burst position error data, the center of the core width of the write head 33 must match the burst boundary 41. In other words, when the center of the target cylinder (or track) matches the burst boundary 41, the center of the core width of the write head 33 must match the center of the target cylinder. Hence, in this embodiment, the burst position error data is written by moving the write head 33 to a position offset in an opposite direction as shown in FIG. 8 by an offset amount identical to the error amount d the write head 33 is offset when switching from the normal data write operation shown in FIG. 6 to the normal data read operation shown in FIG. 7.

Figure 9:
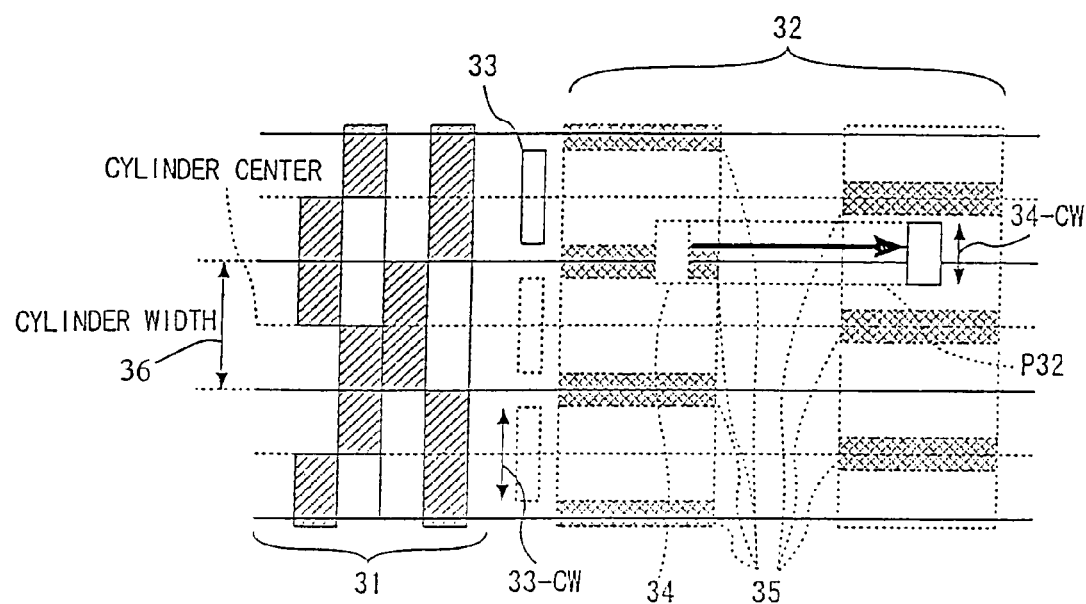
FIG. 9 is a diagram showing an arrangement of the burst position error data written by the embodiment.

FIG. 9 is a diagram showing an arrangement of the burst position error data written by this embodiment, for a case where the feed pitch is ½ track. In FIG. 9, a bold solid line indicates the boundary line of the adjacent cylinders (or tracks), and a broken line indicates the center of the cylinder (or track). Accordingly, in FIG. 9, a vertical direction corresponds to the radial direction of the disk 111, and a horizontal direction corresponds to the circumferential direction of the disk 111. A burst position error data 32 which is written next to a burst pattern 31, is used to correct an error of the write head 33 from the center of the cylinder to which the write head 33 is on-track, and to correct an error of the read head 34 from the center of the cylinder to which the read head 34 is on-track. Although the illustration is omitted in FIG. 9, a data region in which the data write and the data read are carried out is provided next to the burst position error data 32 in the circumferential direction of the disk 111.

Figures 1, 2:
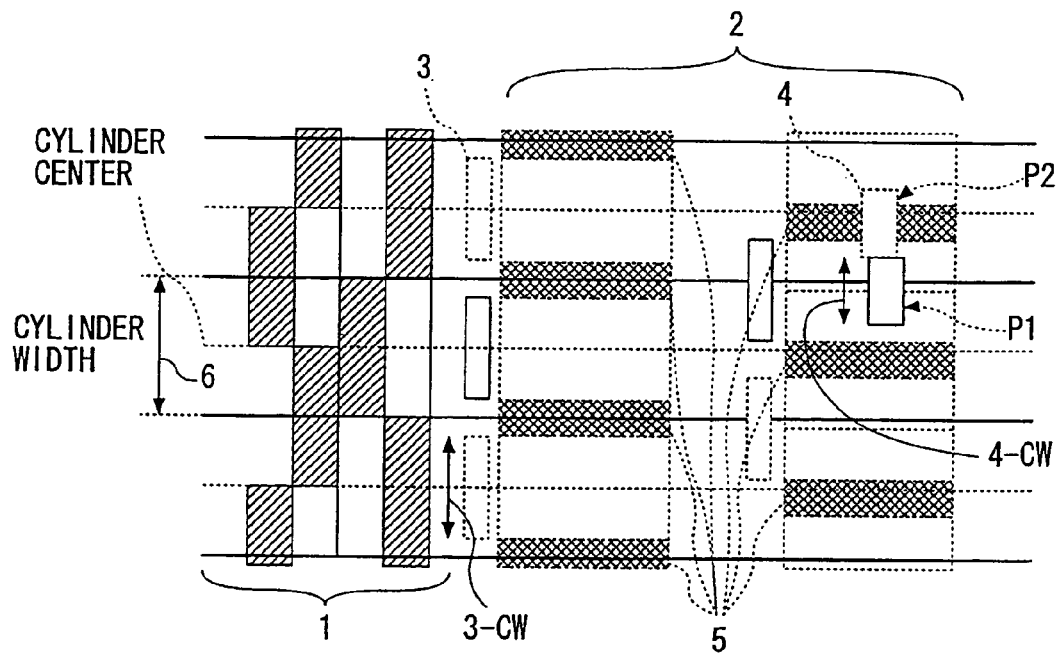
FIG. 1 is a diagram for explaining a servo frame format.
FIG. 2 is a diagram showing an arrangement of burst position error data written by a conventional burst position error data write method.
Figure 3:
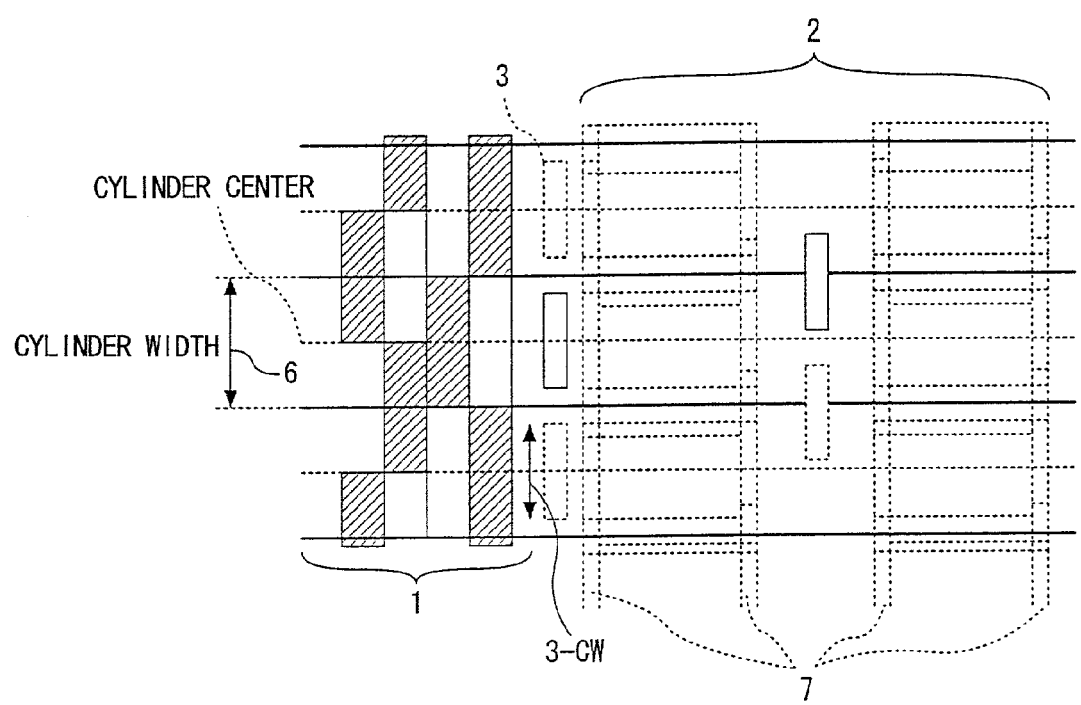
FIG. 3 is a diagram showing an arrangement of burst position error data written by a conceivable burst position error data write method.

A core width 33-CW of the write head 33 is approximately 75% of a cylinder width 36, and a core width 34-CW of the read head 34 is approximately 50% of the cylinder width 36. For this reason, a region 35 in which no burst position error data is written is generated in a position region as indicated by cross-hatching in FIG. 9. In a case where a positional error of the read head 34 from the target cylinder immediately after the seek is relatively small, the read head 34 can read the burst position error data 32 similarly to the case described above in conjunction with FIG. 2. In addition, even in a case where the positional error of the read head 34 from the target cylinder is relatively large, there is a possibility that the read head 34 will first scan the region 35 which is not written with the burst position error data 32, but the read head 34 will positively read the burst position error data 32 which follows the region 35, as indicated by P32 in FIG. 9.

Figure 10:
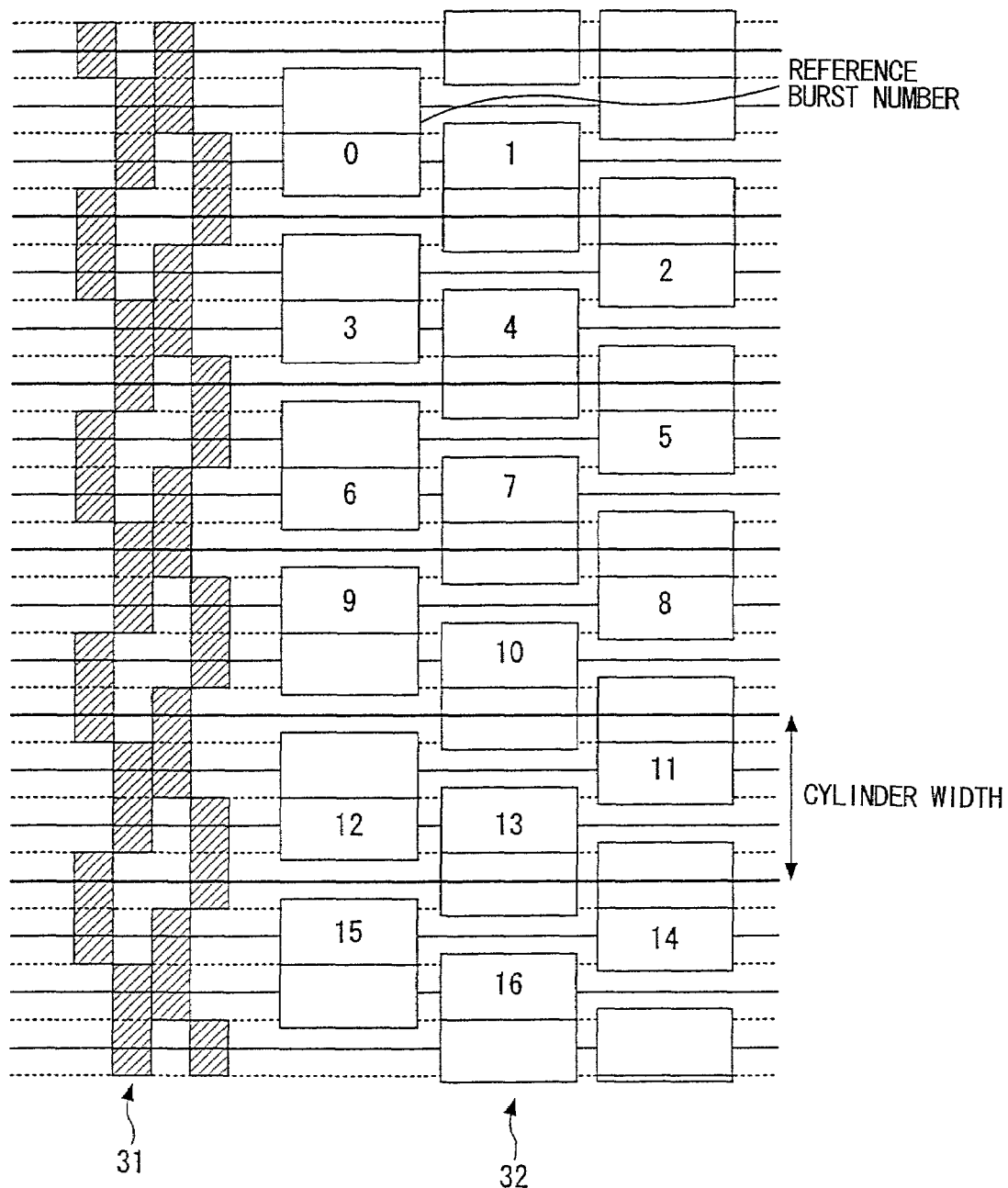
FIG. 10 is a diagram for explaining a relationship of a burst number and a circumferential direction position on a disk when writing the burst position error data.

FIG. 10 is a diagram for explaining a relationship of a burst number and a circumferential direction position on a disk when writing the burst position error data. In FIG. 10, those parts which are the same as those corresponding parts in FIG. 9 are designated by the same reference numerals, and a description thereof will be omitted.

First, a reference burst position is determined. The reference burst position is determined to an outermost peripheral cylinder, an innermost peripheral cylinder or an arbitrary cylinder of the disk 111, for example. In addition, the reference burst position may be determined to the position of an arbitrary burst boundary 41. The positional relationship of the burst number which is the radial direction position from the reference burst position, and the peripheral direction position, is uniquely determined depending on the number of regions of the burst position error data 32 provided after the burst pattern 31 in the scanning direction of the head 115 (direction opposite to the rotating direction of the disk 111). For the sake of convenience, FIG. 10 shows a case where the feed pitch is ⅓ track, the reference burst number 0 is the cylinder number xxx, and three regions of the burst position error data 32 are provided after the burst pattern 31 in the circumferential direction of the disk 111.

Figure 11:
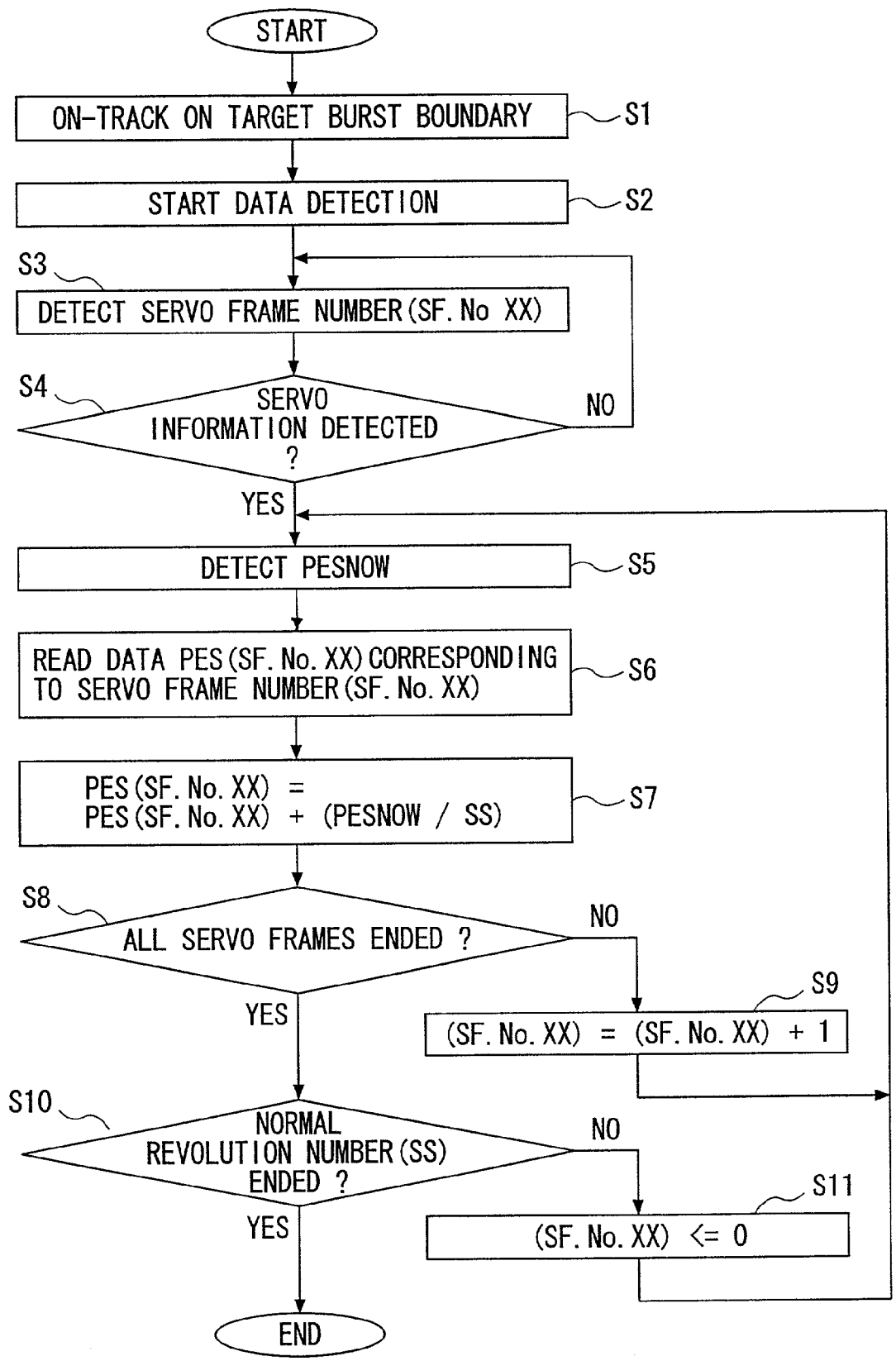
FIG. 11 is a flow chart for explaining a burst position error data read process.

FIG. 11 is a flow chart for explaining a burst position error data read process. The process shown in FIG. 11 is carried out by the MPU 124 shown in FIG. 5 when carrying out a calibration, for example, but the process may be carried out by the MPU 124 together with the HDC 121.

In FIG. 11, a step S1 controls the read head 34 to be on-track on the target burst boundary 41, and a step S2 starts detection of the burst position error data. A step S3 detects a servo frame number (SF. No. XX), and a step S4 decides whether or not the servo information is detected. If the decision result in the step S4 is N( ), the process returns to the step S3. On the other hand, if the decision result in the step S4 is YES, a step S5 detects a present position error signal PESNOW. A step S6 reads a burst position error data PES (SF. No. XX) corresponding to the servo frame number (SF. No. XX). A step S7 carries out an operation PES (SF. No. XX)=PES (SF No. XX)+(PESNOW/SS), and stores an operation result in a memory means such as the RAM 122 or the ROM 123, where SS denotes a normal number of revolutions for carrying out the calibration. A step S8 decides whether or not all of the servo frames have ended.

If the decision result in the step S8 is NO, a step S9 increments the servo frame number (SF. No. XX) by one to (SF. No. XX)=(SF. No. XX)+1, and the process returns to the step S5. On the other hand, if the decision result in the step S8 is YES, a step S10 decides whether or not the above described series of processes have been carried out and ended for the normal number of revolutions SS. If the decision result in the step S10 is NO, a step S11 initializes the servo frame number (SF. No. XX) to 0, and the process returns to the step S5. The process ends if the decision result in the step S10 is YES.

Figure 12:
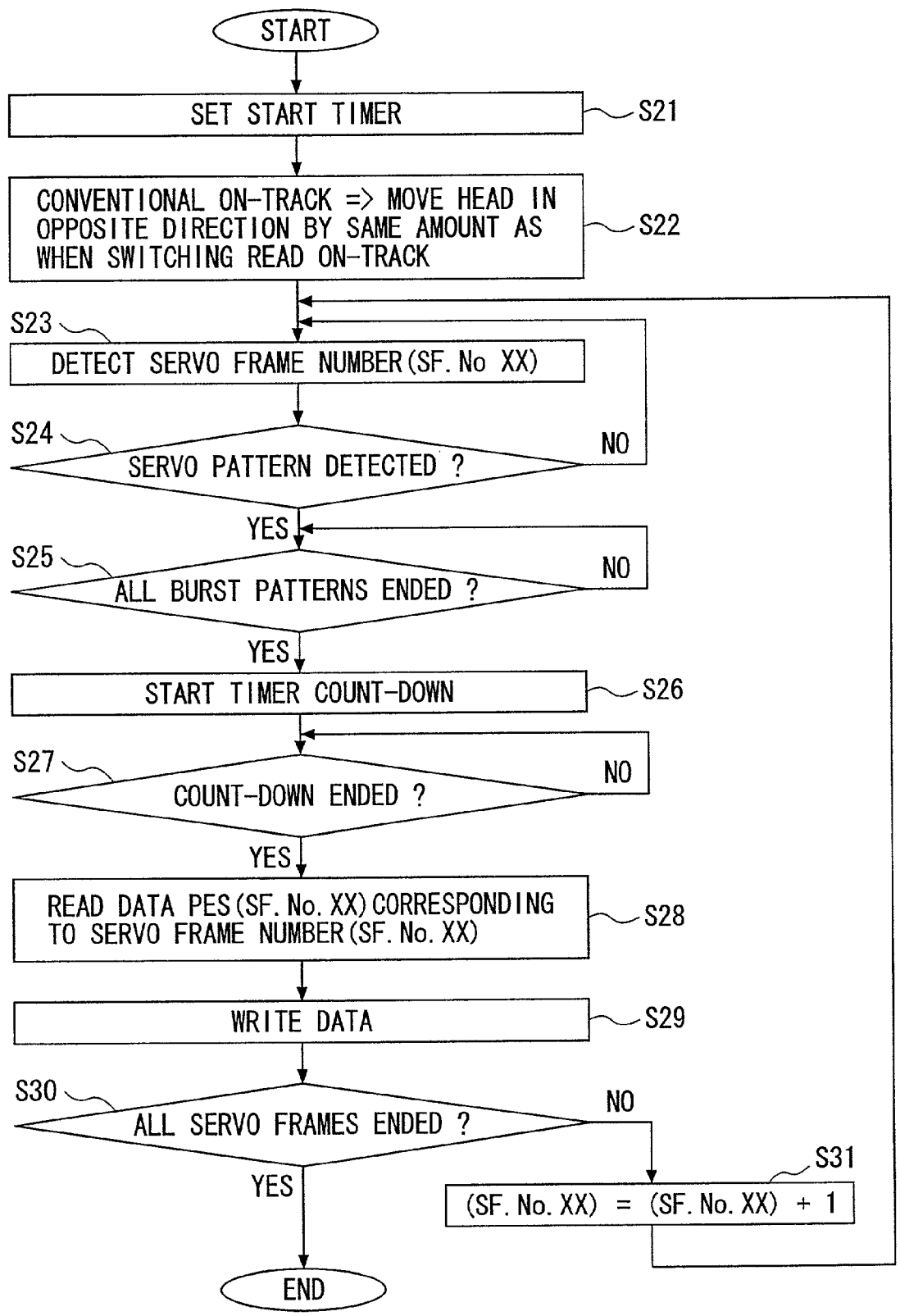
FIG. 12 is a flow chart for explaining a burst position error data write process.

FIG. 12 is a flow chart for explaining a burst position error data write process. The process shown in FIG. 12 is carried out by the MPU 124 shown in FIG. 5, but the process may be carried out by the MPU 124 together with the HDC 121.

In FIG. 12, a step S21 sets a start timer within the MPU 124. This start timer determines a write start timing of the burst position error data. A step S22 moves the write head 33 to a position offset in an opposite direction as shown in FIG. 8 by an offset amount identical to the error amount d the write head 33 is offset when switching from the normal data write operation shown in FIG. 6 to the normal data read operation shown in FIG. 7. A step S23 detects the servo frame number SF. No. XX, and a step S24 decides whether or not the burst pattern of the servo information is detected. If the decision result in the step S24 is NO, the process returns to the step S23. On the other hand, if the decision result in the step S24 is YES, a step S25 decides whether or not all of the burst patterns have ended. The process advances to a step S26 if the decision result in the step S25 is YES.

The step S26 starts count-down of the start timer described above, and a step S27 decides whether or not the count-down of the start timer has ended. If the decision result in the step S27 is YES, a step S28 reads from the memory means such as the RAM 122 and the ROM 123 the burst position error data PES (SF. No. XX) which corresponds to the servo frame number SF. No. XX and was obtained by the operation described above. A step S29 writes the servo position error data on the disk 111 by the write head 33 which is located at the above described position, and a step S30 decides whether or not all of the servo frames have ended. If the decision result in the step S30 is NO, a step S31 increments the servo frame number (SF. No. XX) by one to (SF. No. XX)=(SF. No. XX)+1, and the process returns to the step S23. On the other hand, the process ends if the decision result in the step S30 is YES.

Of course, the burst position error data write process shown in FIG. 12 may be carried out by a servo track writer (STW) exclusively for writing the servo information, so that the burst position error data is written in advance on the disk 111 together with the servo information.

Next, a description will be given of the number of regions of the burst position error data 32 to be provided after the burst pattern 31 in the circumferential direction of the disk 111, based on the relationship of the core width 33-CW of the write head 33 and the feed pitch, by referring to FIG. 13. If the value of the core width 33-CW of the write head 33 is denoted by WHD and the pitch of the burst boundaries 41 is denoted by K, the following relationship stands among the value WHD, the pitch K and a number M of regions of the burst position error data 32 which need to be provided after the burst pattern 31 in the circumferential direction of the disk 111.

① M=1 if WHD<K
② M=2 if K<WHD<2K
③ M=3 if 2K<WHD<3K
④ M=4 if 3K<WHD<4K

Accordingly, the following relationship stands if N is an integer greater than or equal to one.

⑤ M=N if (N−1)K<WHD<NK

Figure 13:
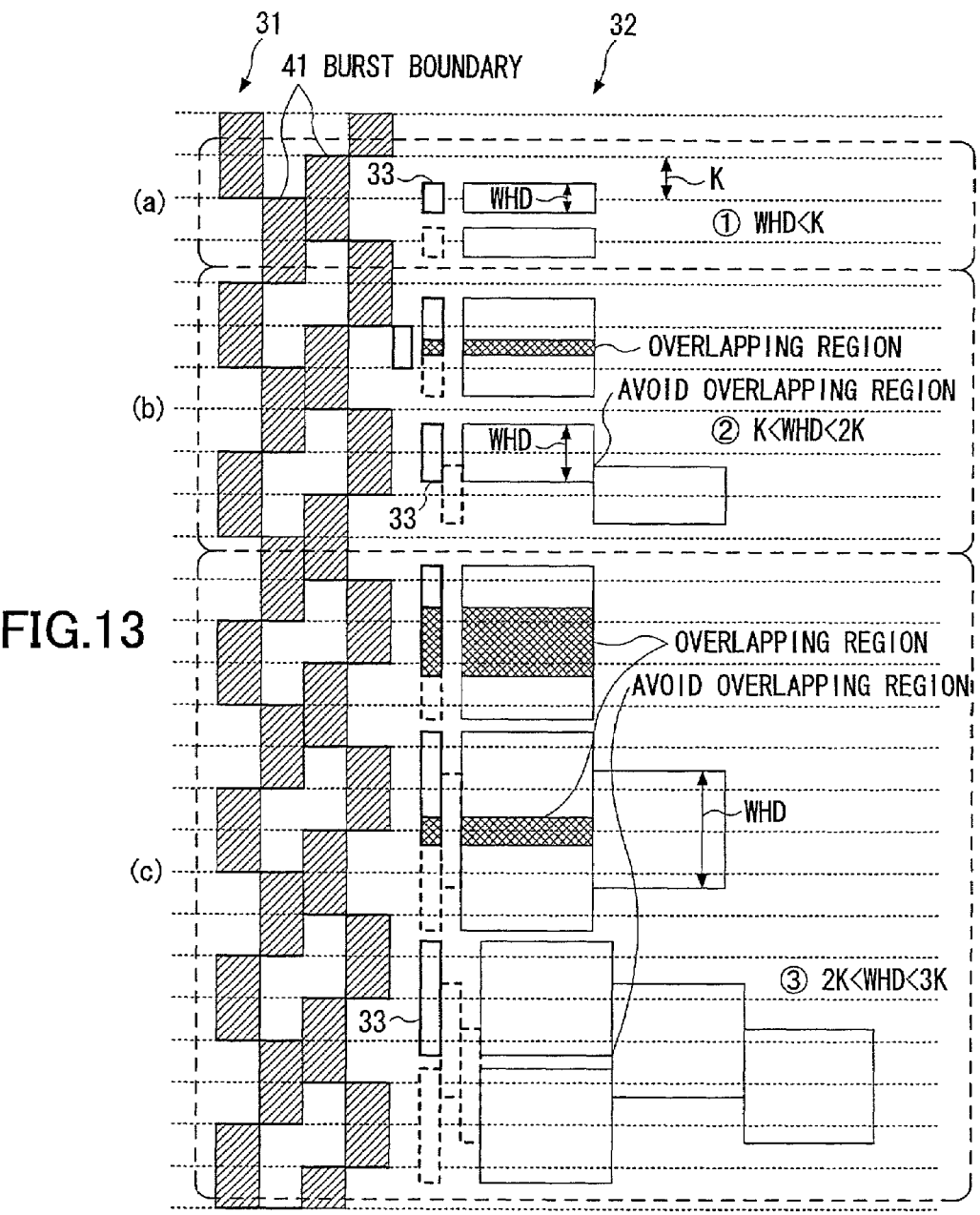
FIG. 13 is a diagram showing a state of the burst position error data written on the disk.

FIG. 13 is a diagram showing a state of the burst position error data 32 written on the disk 111 for the cases ①, ② and ③ described above. In FIG. 13, (a) shows the case ①, (b) shows a case where M=1 in an upper portion and shows the case ② in a lower portion, and (c) shows a case where M=1 in an upper portion, a case where M=2 in a middle portion and the case ③ in a lower portion. In FIG. 13, those parts which are the same as those corresponding parts in FIG. 9 are designated by the same reference numerals, and a description thereof will be omitted.

As may be seen from FIG. 13(b), in the case ②, it is possible to avoid the generation of the regions which overlap in the radial direction as indicated by the cross-hatched portion, by dividing the region of the burst position error data 32 into two regions. In addition, as may be seen from FIG. 13(c), in the case ③, it is possible to avoid the generation of the regions which overlap in the radial direction as indicated by the cross-hatched portions, by dividing the region of the burst position error data 32 into three regions.

Therefore, by satisfying the relationship of the case ⑤, it is possible to eliminate the region in which no burst position error data 32 is written, in the scanning direction of the read head 34 along the circumferential direction of the disk 111. As a result, even if the center of the core width of the read head 34 is located at a position deviated from the center of the cylinder during the on-track state or at the end of the seek, it is possible to positively read the burst position error data 32. In addition, since the region in which the burst position error data 32 overlap in the radial direction of the disk 111 will not be generated, it is possible to correctly read the burst position error data 32.

Further, the present invention is not limited to these embodiments, but various variations and modifications may be made without departing from the scope of the present invention.

What is claimed is:

1. A burst position error data write method for writing, on a magnetic disk, a burst position error data which is used for correcting a positional error of a burst pattern which is used for correcting an error within one track, next to the burst pattern, comprising the step of:
    (a) writing the burst position error data so as to satisfy a relationship M=N when (N−1)K<WHD<NK, where WHD denotes a core width of a write head, K denotes a pitch of burst boundaries of the burst pattern, M denotes a number of regions of the burst position error data which need to be provided after the burst pattern, and N denotes an integer greater than or equal to one.

2. The burst position error data write method as claimed in claim 1, wherein said step (a) is carried out during a calibration of a magnetic disk unit.

3. The burst position error data write method as claimed in claim 1, wherein said step (a) is carried out by a servo track writer (STW) exclusively for writing servo information.

4. A burst position error data write method for writing, on a magnetic disk, burst position error data, which is used for correcting a positional error of a burst pattern having a plurality of burst boundaries and used for correcting an error within one track, next to the burst pattern, comprising the step of:
    (a) writing the burst position error data by moving a write head to a position offset in a direction opposite to and by an offset amount identical to an error amount the write head is offset from a burst boundary of the burst pattern during a normal data write operation,
    wherein the burst position error data is a repeatable run-out (RRO) correction data for correcting a repeatable run-out (RRO), and the burst position error data is recorded with respect to each of a multiple number of the plurality of burst boundaries of the burst pattern.

5. The burst position error data write method as claimed in claim 4, wherein said step (a) matches a center of a core width of the write head to a center of a target cylinder on the magnetic disk when the center of the target cylinder matches the burst boundary of the burst pattern.

6. The burst position error data write method as claimed in claim 4, wherein said step (a) is carried out during a calibration of a magnetic disk unit.

7. The burst position error data write method as claimed in claim 4, wherein said step (a) is carried out by a servo track writer (STW) exclusively for writing servo information.

8. A burst position error data write method for writing, on a magnetic disk, a burst position error data which is used for correcting a positional error of a burst pattern which is used for correcting an error within one track, next to the burst pattern, comprising the step of:
    (a) writing the burst position error data by moving a write head to a position offset in a direction opposite to and by an offset amount identical to an error amount the write head is offset when switching from a normal data write operation to a normal data read operation,
    wherein said step (a) writes the burst position error data so as to satisfy a relationship M=N when (N−1)K<WHD<NK, where WHD denotes a core width of the write head, K denotes a pitch of burst boundaries of the burst pattern, M denotes a number of regions of the burst position error data which need to be provided after the burst pattern, and N denotes an integer greater than or equal to one.

9. A magnetic disk unit which writes, on a magnetic disk, a burst position error data which is used for correcting a positional error of a burst pattern which is used for correcting an error within one track, next to the burst pattern, comprising:
    control means for controlling a position of a write head so as to satisfy a relationship M=N when (N−1)K<WHD<NK, where WHD denotes a core width of a write head, K denotes a pitch of burst boundaries of the burst pattern, M denotes a number of regions of the burst position error data which need to be provided after the burst pattern, and N denotes an integer greater than or equal to one; and
    write means for writing the burst position error data on the magnetic disk by the write head the position of which is controlled by said control means.

10. The magnetic disk unit as claimed in claim 9, wherein said write means writes the burst position error data on the magnetic disk during a calibration of the magnetic disk unit.

11. The magnetic disk unit as claimed in claim 9, wherein a core width of the write head is smaller than a core width of a read head.

12. A magnetic disk unit which writes, on a magnetic disk, a burst position error data which is used for correcting a positional error of a burst pattern having a plurality of burst boundaries and used for correcting an error within one track, next to the burst pattern, comprising:
    control means for moving a write head to a postion offset in a direction opposite to and by an offset amount identical to an error amount the write head is offset from a burst boundary of the burst pattern during normal data write operation; and write means for writing the burst position error data on the magnetic disk by the write head the position of which is controlled by said control means, wherein the burst position error data is a repeatable run-out (RRO) correction data for correcting a repeatable run-out (RRO), and the burst position error data is recorded with respect to each of a multiple number of the plurality of burst boundaries the burst pattern.

13. The magnetic disk unit as claimed in claim 12, wherein said control means controls the position of the write head so as to match a center of a core width of the write bead to a center of a target cylinder on the magnetic disk when the center of the target cylinder matches the burst boundary of the burst pattern.

14. The magnetic disk unit as claimed in claim 12, wherein said write means writes the burst position error data on the magnetic dusk during a calibration of the magnetic disk unit.

15. A magnetic disk unit which writes, on a magnetic disk, a burst position error data which is used for correcting a positional error of a burst pattern which is used for correcting an error within one track, next to the burst pattern, comprising:

a control part configured to move a write head to a position offset in a direction opposite to and by an offset amount identical to an error amount the write head is offset when switching from a normal data write operation to a normal data read operation; and a write part configured to write the burst position error data on the magnetic disk by the write head the position of which is controlled by said control part, wherein said control pan controls the position of the write head so as to satisfy relationship M=N when (N−1)K<WHD<NK, where WHD denotes a core width of the write head, K denotes a pitch of burst boundaries of the burst pattern, M denotes a number of regions of the burst position error data which need to be provided after the burst pattern, and N denotes an integer greater than or equal to one.

16. A magnetic disk unit which writes, on a magnetic disk, a burst position error data which is used for correcting a positional error of a burst pattern which is used for correcting an error within one track; next to the burst pattern, comprising:

a control part to control a position of a write head so as to satisfy a relationship M=N when (N−1)K<WHD<NK, where WHD denotes a core width of a write head, K denotes a pitch of burst boundaries of the burst pattern, M denotes a number of regions of the burst position error data which need to be provided after the burst pattern, and N denotes an integer greater than or equal to one; and a write part to write the burst position error data of the magnetic disk by the write head the position of which is controlled by said control part.

17. A magnetic disk unit which writes, on a magnetic disk, a burst position error data which is used for correcting a positional error of a burst patter having a plurality of burst boundaries and used for correcting an error within one track, next to the burst pattern, comprising:

a control part to move a write head to a position offset in a direction opposite to and by an offset amount identical to an error amount the write head is offset from a burst boundary of the burst pattern during a normal data write operation; and a write part to write the burst position error data or the magnetic disk by the write head the position of which is controlled by said control par, wherein the burst position error data is a repeatable run-out (RRO) correction data for correcting a repeatable run-out (RRO), and the burst position error data is recorded with respect to each of a multiple number of the plurality of burst boundaries of the burst pattern.

* * * * *

UNITED STATES PATENT AND TRADEMARK OFFICE
CERTIFICATE OF CORRECTION

| | | |
|---|---|---|
| PATENT NO. | : 7,133,243 B2 | Page 1 of 1 |
| APPLICATION NO. | : 09/961727 | |
| DATED | : November 7, 2006 | |
| INVENTOR(S) | : Masakazu Hirano | |

It is certified that error appears in the above-identified patent and that said Letters Patent is hereby corrected as shown below:

In the Claims:

Col. 12, line 21, delete "patter" and insert --pattern--.

Col. 12, line 29, delete "or" and insert --on--.

Col. 12, line 31, delete "par" and insert --part--.

Signed and Sealed this

Third Day of April, 2007

JON W. DUDAS
*Director of the United States Patent and Trademark Office*